US008771832B2

(12) United States Patent
Bissett et al.

(10) Patent No.: US 8,771,832 B2
(45) Date of Patent: Jul. 8, 2014

(54) LIGNIN/POLYACRYLONITRILE-CONTAINING DOPES, FIBERS, AND METHODS OF MAKING SAME

(75) Inventors: Paul J. Bissett, Des Moines, WA (US); Carole W. Herriott, Bremerton, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 790 days.

(21) Appl. No.: 12/828,054

(22) Filed: Jun. 30, 2010

(65) Prior Publication Data

US 2012/0003471 A1 Jan. 5, 2012

(51) Int. Cl.
*D01F 9/00* (2006.01)
*C01B 31/00* (2006.01)
*D01F 6/18* (2006.01)
*C08K 5/13* (2006.01)

(52) U.S. Cl.
USPC ............ 428/368; 524/72; 264/29.1; 264/206

(58) Field of Classification Search
USPC ...................... 524/72; 428/368; 264/29.1, 206
See application file for complete search history.

(56) References Cited

U.S. PATENT DOCUMENTS

| | | | |
|---|---|---|---|
| 3,461,082 | A | 8/1969 | Otani et al. |
| 3,723,609 | A | 3/1973 | Mansmann et al. |
| 5,709,774 | A | 1/1998 | Naieni |

FOREIGN PATENT DOCUMENTS

| JP | 42-023982 | * 11/1967 |
|---|---|---|
| JP | 4223982 | 11/1967 |

OTHER PUBLICATIONS

English translation of JP 42-023982. Nov. 1967.*
Sazanov, Yu N., et al. Composites of Lignin and Polyacrylonitrile as a Carbon Precursors, Macromolecular chemistry and Polymeric Materials, Institute of Macromolecular Compounds, Russian Academy of Sciences, St. Petersburg, Russia, Dec. 25, 2007.

* cited by examiner

*Primary Examiner* — John Uselding
(74) *Attorney, Agent, or Firm* — Timothy M. Whalen; Weyerhaeuser Law Dept.

(57) ABSTRACT

The invention relates to a process for preparing a composition comprising 10 to 45% of the total solids weight lignin, polyacrylonitrile or a polyacrylonitrile copolymer, and a solvent to form a lignin-based polyacrylonitrile-containing dope and the resulting products. The dope can be processed to produce fibers, including precursor, oxidized and carbonized fibers. The oxidized fibers are of value for their flame resistant properties and carbonized fibers are suitable for use in applications requiring high strength fibers, or to be used to form composite materials.

14 Claims, 5 Drawing Sheets

Reduction in Viscosity (Poise) Due to Increasing Lignin.

| PAN/Lignin Ratio in sample | Green/Precursor Fiber | | | Oxidized Fiber | | | | Carbonized Fiber | | | |
|---|---|---|---|---|---|---|---|---|---|---|---|
| | Dia. | Tensile | Modulus | Elong. | Dia. | Tensile | Modulus | Elong. | Dia. | Tensile | Modulus | Elong. |
| | microns | ksi | Msi | % | microns | ksi | Msi | % | microns | ksi | Msi | %  |
| PAN3 with 25% Lignin | 23.1 | 38.7 | 1.2 | 8.4 | | | | | 16.8 | 82 | 7.8 | 1.0 |
| PAN3 with 24.5% Lignin | | | | | 17.1 | 13.2 | 0.45 | 3.5 | | | | |

*Fig.1.*

LIGNIN/POLYACRYLONITRILE-CONTAINING DOPES, FIBERS, AND METHODS OF MAKING SAME

FIELD OF THE INVENTION

The invention relates to the preparation of a polyacrylonitrile (PAN) or PAN copolymer based dope for fiber preparation comprising polyacrylonitrile (PAN) or PAN copolymers, and a solvent which also contains lignin. The dope can be processed to produce fibers, such as by solution or wet spinning. The fibers may be processed further to form products, such as oxidized or carbonized fibers. The oxidized fibers are of value for their flame resistant properties and carbonized fibers are suitable for use in applications requiring high strength fibers, or to be used to form composite materials.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIG. 1 is a table showing properties of "green" (precursor), oxidized, and carbonized fibers.

DETAILED DESCRIPTION

Figure 2:
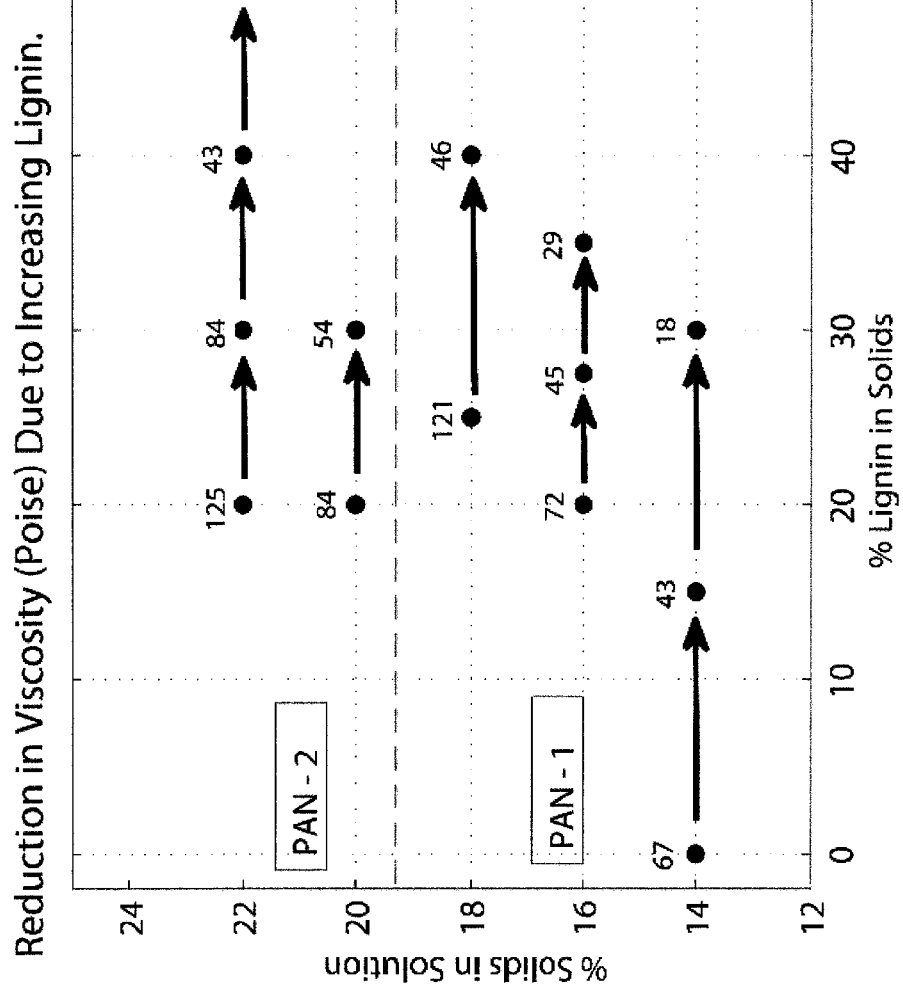
FIG. 2 is a graphic showing the relationship of lignin content, solids content, and solution viscosity with respect to PAN 1 and PAN 2.

For the past 30 years PAN or PAN copolymers have been the industry standard for precursor fibers used for the production of heat treated fibers and carbon fibers. Carbon fibers are highly valued for their low weight, high strength, stiffness and resistance to fatigue.

As used herein, "PAN" refers to a polyacrylonitrile homopolymer having a molecular weight ranging from about 50,000 to 500,000 and an intrinsic viscosity of 1 to 4.

As used herein, a "PAN copolymer" refers to a copolymer of polyacrylonitrile and a comonomer such as vinyl acetate, methyl acrylate, methyl methacrylate, or methyl itaconate to provide a copolymer such as PAN-vinyl acetate, PAN-methyl acrylate or PAN-methyl methacrylate. Molecular weights of the PAN copolymers may range from about 50,000 to 500,000.

A solvent is used to dissolve the PAN or PAN copolymer and create a spinning dope. The solvents used are DMF (dimethylforamide), DMAA or DMAc (dimethylacetamide), and DMSO (dimethylsulfoxide). A viscose solution, though considered for use as a solvent for some chemicals, is not used with PAN or PAN copolymer.

Additional components may be added in the polymerization process for making the PAN. For example, persons of skill in the art are familiar with agents that facilitate cyclization of acrylamide, including carboxylic acid-containing species, such as vinyl carboxylic acids. Non-limiting examples of carboxylic acids that may be included in dopes described herein include acrylic acid, methacrylic acid, ethacrylic acid, crotonic acid, isocrotonic acid, itaconic acid, maleic acid, mesaconic acid, citraconic acid, p-vinyl benzoic acid, and m-vinyl benzoic acid, and alkali and ammonium salts thereof. Carboxylic acid-containing species may be added to dopes described herein in amounts up to and including 1%.

The PAN or PAN copolymer dope is then spun into a fiber. Several methods of spinning dopes into fibers are known in the art. Solution or wet spinning and dry-jet wet spinning are exemplary methods that may be employed in methods of the present invention to produce the fibers described herein. Additional information regarding spinning techniques is found in the Examples below.

Solution or wet spinning is well known in the art. In solution or wet spinning the polymer to be made into a fiber is dissolved in a solvent to create a viscous spinning dope. The dope is typically passed through a filter and, through a multi-hole spinneret into a coagulation bath. The dope exiting the spinneret produces fibers as the dope coagulates. Dope coagulation occurs as result of the co-diffusion of water, the anti-solvent, into the fibers and solvent out of the fibers. The fibers typically pass to a solvent stretching bath where the fibers are stretched and as a result drawn down to a smaller diameter. Residual solvent is removed in a series of washing steps. The fiber is then dried. The resulting fiber may be further drawn down to a smaller diameter, if desired.

In dry-jet wet spinning, the viscous polymer dope is extruded in fiber form from a spinneret into and through an air gap and then into a coagulation bath in which the polymer dope is coagulated into a fiber. The passage through the air gap is under some tension and gravity pull which creates some orientation of the polymer molecules in the lengthwise direction of the fiber. The coagulation bath also extracts the solvent from the dope. Tension is applied to the fiber as it leaves the coagulating bath. This stretches the fiber, which improves the degree of orientation of polymer molecules in the lengthwise direction of the fiber. The fiber will pass through washing steps to remove residual solvent and is then dried.

As used herein, the solids content of the dope solution is the material, other than the solvent, that is in the solution. The weight of the solids in solution is the total weight of the solution less the weight of the solvent.

The solids content in the dope is a determining factor in the rate of fiber production. Increasing the solids content of the dope can increase the rate of fiber production. However, viscosity becomes limiting factor to fiber production as the viscosity exceeds the process design limits for pressure and pumping capacity. The solids content of the dope and the viscosity of the dope are also related. As the solids content of the dope is increased the viscosity of the dope is increased. There is a tension between increasing production by increasing solids in the dope and decreasing production because the increased solids content of the dope makes the dope too viscous.

The viscosity of the PAN or PAN copolymer dope is also a determining factor in the propensity for fiber formation. A fiber will not be formed if the viscosity of the PAN or PAN copolymer is too low, but rather will extrude into droplet or discontinuous fibers. There is a lower viscosity threshold before the PAN or PAN copolymer will form fibers. This typically is around 20 poise.

The viscosity of the PAN or PAN copolymer dope must be high enough to form fibers but low enough to flow through the spinneret or extrusion head at rates that provide a good production rate. The solids content of the PAN or PAN copolymer dope must be high enough to provide a rate of flow that provides a good production rate. The solids content and viscosity of the dope must be balanced to provide a good production rate.

In one embodiment the maximum viscosity is 1500 poise at 20 to 80° C. In another embodiment the maximum viscosity is 1000 at 20 to 80° C.

The viscosity of the PAN or PAN copolymer dope is also dependent on the other polymer that is used and on any additives that may be used. The viscosity is also dependent on the temperature of the dope. As the temperature is increased, the viscosity is decreased.

Increasing the temperature of the dope solution has been a method of increasing the solids because the higher temperature lowers the viscosity. Again, there is a trade-off because increasing the temperature increases the energy costs of the process and the cost of the fiber product. There is also a maximum temperature to which the dope can be heated before other reactions may occur in the dope.

The inventors have developed a process and product which reduces the need for higher temperatures to maintain the viscosity of the dope in a usable range thereby lowering the cost of the process and the resulting product. The reduction in viscosity and temperature reduces the need for more robust equipment required for higher viscosity and higher temperatures. The new process and product also reduces the raw material cost of the product.

The inventors have found that the addition of lignin to PAN or PAN copolymer dope will lower the viscosity of the dope and allow the solids content of the dope to be increased. The inventors have also found the maximum amount of lignin that can be added to the PAN or PAN copolymer dope is 45% of the weight of the solids content. The solids content of the dope is the total weight of the dope less the weight of the solvent. The solids content of the dope would include the PAN or PAN copolymer, any additives and the lignin and the weight of the solids content of the dope would be the total weight of these elements. The weight of lignin in the dope would be 10 to 45% of this total weight.

Lignin is a common byproduct of the pulp and paper industry, separated from trees by hydrolytic degradation in chemical pulping processes that consistently produce well-defined lignin. Kraft, or sulfate, lignin is obtained from the kraft pulping process, and sulfite lignin (lignosulfates or lignin sulfonates) is obtained from the sulfite pulping process. High pressure steam or organic solvents can also used to extract lignin from plant materials. The physical and chemical properties of lignin depend on its plant source and processing conditions. Lignosulfates, which are hydrophilic, can dissolve in water, and kraft lignins, which are hydrophobic, cannot dissolve in water. Industrial wood pulping processes have been viewed as a potential source of inexpensive lignin-based precursor materials having consistent, well-defined compositions even though lignin can vary in molecular weight and chemical homogeneity because of the differences in the types and ratios of intermonomeric units and linkages.

Lignin is one of the biopolymers found in plants.

Plant cell walls are primarily composed of three biopolymers: cellulose, hemicellulose, and lignin. Cellulose is a relatively simple polymer of D-glucose molecules, linked to one another primarily with glycosidic bonds. Hemicelluloses are branched polymers of xylose, arabinose, galactose, mannose, and glucose. Hemicelluose polymers bind bundles of cellulose fibrils to form microfibrils and cross-link with lignin, creating a complex web of bonds which enhance the structural stability of the cell wall. Lignin is a complex, three-dimensional biopolymer found in all vascular plants, accounting for one-fourth to one-third of the dry mass of wood in gymnosperms and angiosperms. Lignins are formed from enzyme-mediated dehydrogenative free-radical polymerization of cinnamyl alcohol-based precursors (Formula 1). The dominant intermonomer unit linkage is the aryglycerol-β-O-4 aryl ether linkage. The β-O-4 linkage accounts for 48-60% of the total inter-unit linkages in lignin (Braun et al., *Carbon*, 43:385-394 (2005)).

FORMULA 1

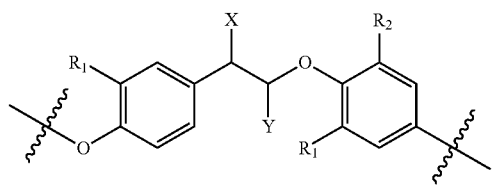

$R_1$ = H, $OCH_3$, or Ar
$R_2$ = H or $OCH_3$
X = OH or OAr, or O when the bond to the adjacent carbon atom is a double bond
Y = $CH_2OH$ Lignins can be grouped into three broad classes: softwood or coniferous (gymnosperm), hardwood (dicotyledonous angiosperm), and grass or annual plant (monocotyledonous angiosperm) lignins. Softwood lignins are often characterized as being derived from coniferyl alcohol or guaiacylpropane (4-hydroxy-3-methoxyphenylpropane) monomer (Formula 2). Hardwood lignins contain polymers of 3,5-dimethoxy-4-hydroxyphenylpropane monomers (Formula 3) in addition to the guaiacylpropane monomers. The grass lignins contain polymers of both of these monomers, plus 4-hydroxyphenylpropane monomers (Formula 4). Hardwood lignins are much more heterogeneous in structure from species to species than the softwood lignins when isolated by similar procedures.

FORMULAS 2, 3, AND 4

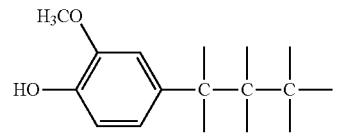

(2)

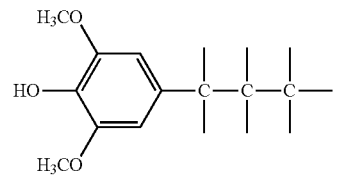

(3)

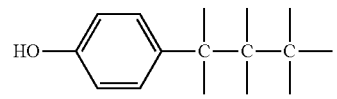

(4)

Typical softwoods that may be used are pines, spruces, larches, Douglas fir, fir, hemlock, cedar and juniper. Typical hardwoods that may be used are aspen, basswood, beech, birch, cottonwood, gum, maple, ash, chestnut, elm and eucalyptus.

In the wood pulping process most of the lignin and hemicellulose in the wood is separated from the cellulose in the digester by the sulfate or sulfite cooking liquor. The chemicals in the cooking liquor react with the hemicellulose and lignin and cause them to go into solution. The materials exiting the pulp digester are the black liquor containing the lignin and hemicellulose, and the pulp fibers containing the cellulose and residual lignin and hemicellulose. This residual material is removed in later bleaching stages.

Lignin can be purified from black liquor by using a process designed to preferentially precipitate lignin using a series of acid treatments as is known in the art. Kraft process lignin generally is isolated by acid precipitation from the black liquor of a kraft pulping process at a pH below the pKa of the phenolic groups. Depending on conditions under which the lignin is precipitated, the precipitated lignin may be either in the form of free acid lignin or a lignin salt. If lignin is precipitated at a high pH, such as about 9.5 to 10, the lignin is obtained in the form of a salt. If this lignin is then processed by washing and acidifying to a low pH, such as about 2 to 5, and further washed so as to be substantially free of salt and ash-forming ingredients, free acid lignin, known as "A" lignin, is obtained. A monovalent salt of lignin, such as an alkali metal salt or an ammonium salt, is soluble in water, whereas free acid lignin and polyvalent metal salts of lignin are insoluble in water. Lignin suitable for the present invention is not water-soluble. Exemplary methods for separating lignin from black liquor and from a lignin-containing liquid/slurry have been described in WO 2006/031175 and WO 2006/038863, respectively. Partially-purified lignin can be purchased from several commercial suppliers, such as Westvaco, Inc. (SWKL-Indulin AT®), and Repap (Organosolv lignin-Alcell®). Solvent extraction methods can also be used to generate lignin from various sources.

Lignin can also be prepared from other types of biomass, including grasses, and consistent batches of lignin-rich materials recovered from the waste materials in large-scale brewing or biorefinery processes. The absolute and relative amounts of lignin in a lignin feedstock may vary. Large-scale manufacturing processes typically offer an inexpensive source of lignin-based precursors or feedstock that may be used directly in the process of the invention, or pre-treated with enzymes or chemicals to facilitate lignin purification and recovery from a bulk, crude feedstock. Enzymes, for example, may be used to degrade the lignin, reducing its molecular weight to a preferred range or reduce the amount of intermolecular cross-linking. Chemicals may also be used to alter selected side chains or moieties on the lignin-based materials, or to facilitate the hydrolysis of intramolecular or intermolecular bonds between subunits or chains, respectively. The enzymatic or chemical treatments are typically designed to improve the physical or chemical characteristics of the resulting product, to increase homogeneity, achieve a desirable solubility in preferred solvents, select a preferred molecular weight range, or facilitate the spinnability of fibers.

In one embodiment the lignin-feedstock is characterized as having a total ash contend of less than 0.2% by weight. Further, in this embodiment, the kraft lignins can have a weight average molecular weight between 1,000 and 30,000 and potentially higher for other lignin sources One embodiment of the invention includes a process wherein the lignin supplied to the process is selected from the group consisting of purified lignin, black liquor precipitate, and lignin/cellulose residues prepared from biorefinery or brewing waste materials. The lignin may be prepared from softwood or hardwood materials. Another embodiment of the invention includes a process wherein the lignin is from black liquor and is prepared from softwood fiber source. Another embodiment of the invention includes a process wherein the lignin is from black liquor and is prepared by a process comprising the steps of: (a) filtration; (b) acidification of the black liquor to precipitate the lignin; (c) centrifugation or filtration of the acidified black liquor to separate the lignin precipitate from the black liquor; (d) washing the lignin to remove extraneous material such as ash, (e) an optional filtration to separate the lignin from the wash water, (f) additional washing and filtration steps if needed, and (g) drying the lignin.

There have been attempts to produce carbon fibers based on lignin and lignin fractions but these attempts have so far been limited by the inability to produce filaments with desirable chemical and physical properties amenable to the subsequent processing required for the conversion of the precursor fiber to a heat treated fiber or carbon fiber. These attempts have not produced long flexible fibers of small diameter and good green strength. In these attempts lignin was tried as the main, and often the sole, element of the production of fiber and the fiber so produced were stiff and brittle. Melt spinning, in which the lignin was heated to a molten state and extruded, was tried. Often the softwood lignin charred and the hardwood lignin was not easily stabilized so that the fiber melted or had voids which reduced strength.

The inventors realized that melt spinning was not the way to produce lignin containing fibers. The inventors realized that lignin should not be the main ingredient in the fiber. It should be an adjunct to another chemical.

The inventors came to the realization that there was synergy in combining lignin with a PAN or PAN copolymer based dope. Lignin had very poor fiber properties on its own. PAN and PAN copolymer based dope made good fiber but had production limitations. The inventors discovered a fiber which had good properties and could increase the production rate of precursor fibers using the PAN and PAN copolymer dopes.

In making the dope the lignin fraction is 10 to 45% of the total weight of the solids in the dope, that is the total weight of the lignin, the PAN or PAN copolymer and any other additives. The solvent should be one that is a solvent for both lignin and the PAN or PAN copolymer. Some of these solvents are DMF, DMAA or DMAc, and DMSO. The total solids in the solution can be from 10 to 35% by weight. The actual total solids content will depend on the amount of lignin in the mix. A higher ratio of lignin to PAN or PAN copolymer in the mix will allow a higher total solids content in the solution. The purpose is to maintain the viscosity of the solution in the range of 20 to 1500 poise at a temperature of 20° C. to 80° C. while keeping the total solids content as high as possible.

Typically, the lignin and the PAN or PAN copolymer are added to the solvent and the solution is mixed. The solution is deareated prior to fiber spinning to achieve good spinnability and to reduce the possibility of voids in the fiber. The lignin containing PAN or PAN copolymer based dope may be spun into precursor fibers by solvent or wet spinning or dry jet wet spinning as described above. The fibers are coagulated, stretched, washed, filtered and dried as described above.

The precursor, oxidized and carbonized fibers described herein may be characterized by a variety of analytical techniques. Among them are chemical content, degree of polymerization, X-ray diffraction, fiber diameter, tensile strength, birefringence, crystallinity index, TGA, and DSC. Techniques to measure these properties are well-known in the art, and various methods are described in the Examples section below.

A typical precursor fiber comprising 10 to 45% by weight lignin and further comprising polyacrylonitrile or polyacrylonitrile copolymer and could have a total stretch of 7 to 15 times, a denier of 0.6 to 4.5, a diameter of 8 to 25 microns, a tensile strength of 30 to 100 ksi, a tensile modulus of 0.6 to 20 Msi and an elongation of 8 to 18%.

Carbon fibers, which have been prepared from a variety of precursor materials including rayon, pitch (from petroleum or coal), and PAN, are highly valued for their strength, stiffness, resistance to fatigue and low weight. Carbon fiber composite materials can be found in aerospace materials, sports equipment, marine products, and products for the automotive industry, among the many other applications. Carbon fibers may be made by treating fibers at up to 2000° C. in an inert atmosphere, while maintaining a fibrous structure. In one embodiment the temperature is 600 to 2000° C. A typical carbonized fiber comprises a reaction product of lignin and polyacrylonitrile or polyacrylonitrile copolymer and could have a diameter of 5 to 20 microns, a tensile strength of 80 to 400 ksi, a tensile modulus of 7 to 30 Msi, and an elongation of 0.8 to 1.4%.

Prior to carbonization, the precursor fibers are first stabilized by oxidation, by heating them at 200-300° C. for 60 to 180 minutes in the presence of air, to facilitate intra and inter molecular crosslinking to produce thermally stabilized fibers, which prevents shrinking, melting, and fusing in carbonization. A typical oxidized fiber comprises a reaction product of lignin and polyacrylonitrile or polyacrylonitrile copolymer and could have a diameter of 6 to 22 microns, a tensile strength of 10 to 30 ksi, and an elongation of 3 to 20%.

Methods for making PAN precursor fibers and oxidized and carbonized fibers from the PAN precursor fibers are known. U.S. Pat. No. 5,804,108 is exemplary.

In the heating process for both oxidation and carbonization there can be a reaction product of the lignin and PAN or PAN copolymer at the oxidation and carbonization temperatures.

Any method discussed herein may employ any lignin/PAN or lignin/PAN copolymer fiber described herein.

EXAMPLES

The following materials were used in the enumerated Examples, unless otherwise noted.

Polyacrylonitrile (PAN).

PAN1, PAN2, PAN 3, and PAN 4 were supplied by Sterling Fibers, Inc. (Pace, Fla.). PAN 1 and PAN 2 are carbon fiber precursor grade; PAN 3 and PAN 4 are textile grade.

TABLE 1

PAN polymers and copolymers.

| Polymer | Copolymer | Intrinsic Viscosity dL/g | Approximate M. Wt. |
| --- | --- | --- | --- |
| PAN 1 | Copolymer | 2.1 | 225,000 |
| PAN 2 | Copolymer | 1.65 | 147,000 |
| PAN 3 | Copolymer - vinyl acetate | 1.15 | 70,000 |
| PAN 4 | Homopolymer | 1.93 | 189,000 |

Lignin.

Softwood kraft lignin was used as produced by acid precipitation of the black liquor from pulping predominately a Spruce wood species fiber source.

Example 1

Preparation and Characterization of "Green" (Precursor) Fibers

Lignin and PAN or PAN copolymer blended solutions or "dopes" were prepared by weight/weight blends of the component materials and the solvent. The standard method of preparation for the blends was to prepare a lignin solution of known solids content by dissolving a set amount of the lignin in the solvent. Then the correct aliquot of the known lignin/solvent solution was weighed out, and additional solvent was then weighed and added to the sample. A specified quantity of the desired PAN or PAN copolymer was then added to the sample in the quantity necessary to reach the desired lignin/PAN or lignin/PAN copolymer ratio and total solids. The prepared sample was then mixed using a Silverson L5M-A Series high shear laboratory mixer. The PAN, lignin/PAN, or lignin/PAN copolymer solutions were allowed to sit, typically overnight, and then deaerated prior to fiber spinning Deaeration of the dopes was completed using a standard lab vacuum pump producing approximately 30 inches Hg vacuum.

Fiber spinning was achieved using a laboratory solution spinning line. To those skilled in the art, it is well understood the complexity of the solution spinning process. The general process of solution spinning is well documented in the literature and the fiber spinning associated with this work follows the typical fiber processing. The exact conditions for fiber forming and stretching were modified in response to observed spinning conditions, fiber performance, and processing attributes. The technology associated with solution spinning acrylic based fiber can be found in references such as: Acrylic Fiber Technology and Applications, 1995, edited by James C. Mason, New York, Marcel Decker, Inc.

In general, the prepared dope was spun through a spinneret of between 30 and 1000 holes with each hole of between 45 and 75 microns. The fibers were then coagulated in a bath of 40% dimethylacetamide (DMAc) and 60% water (wt./wt. basis). The subsequent bath was a solvent stretch bath with a solvent concentration of 20% DMAc and 80% water (wt./wt. basis). The fibers were then washed in ambient temperature water followed by a heated water bath of 80-90° C., which was followed by the hot stretch bath at near boiling temperature (~99° C.). The fibers were then dried and stretched using a series of four electrically heated rolls.

Mechanical properties of the green precursor fibers (single-tow) were measured using a modified ASTM D 7269 standard (modifications follow). An Instron 4400R frame running Blue Hill2 software version 2.19 was used in conjunction with a 100N load cell. The testing dimensions were a gauge length of 250 mm and standard yarn geometry with a testing speed of 125.00 mm/minute. Rectangular pneumatic grips were used with a pressure of 40 psi. The fiber samples were first conditioned for 24 hours at 50% RH and 22° C. Approximately 1-2 meters length of yarn/fiber tow was removed from the spool before starting the testing procedure. Each specimen was wrapped as close as possible into the center of the upper and lower grips and clamped into place, taking care not to twist the yarn. After the test was completed, the replicate was considered "good" if the break in the yarn did not occur within 10 mm of either grip, otherwise the repetition was rejected. Ten "good" repetitions were used for report calculations.

The following are modifications to the ASTM D7269 procedure:

Section 6.1.1—Rectangular grips are used, not the Bollard style

Section 7.3.3—After the required amount of yarn was removed, the sample was not cut into individual segment lengths, but tested from a continuous strand, with the post-tested areas pulled out of the testing range prior to a new test.

TABLE 2

Properties of "green" (precursor) fibers produced from
solution spinning lignin and PAN in dimethylacetamide:

| PAN/Lignin Ratio | Total Stretch | Green/Precursor Fiber | | | | |
|---|---|---|---|---|---|---|
| | | Denier | Diameter microns | Tensile Ksi | Modulus Msi | Elongation % |
| PAN 3 only | 7x | 1.67 | | 30.3 | 0.58 | 11.4 |
| PAN 3 with 45% Lignin | 7.6x | 1.36 | | 30.3 | 0.71 | 13.1 |
| PAN 3 with 45% Lignin | 7.6x | 0.64 | | 39.5 | 1.98 | 12.7 |

The properties of these "green" fibers demonstrate that lignin can be incorporated to produce fibers of mechanical and physical properties attractive for consideration as precursor fibers for the production of, for example, commercial oxidized and/or carbonized fibers.

Example 2

Preparation and Properties of Oxidized and Carbonized Fibers

Fibers as prepared in Example 1 were oxidized and carbonized to produce fibers that may be used, e.g., as flame retardant fibers or carbon fibers.

The precursor fiber (PAN 3) was oxidized up to a maximum temperature of 300° C. for approximately 2 hours. Properties of the filaments after oxidationare shown in FIG. 1.

Carbonized fiber was produced by first oxidizing the fiber as outlined above and then carbonizing in a continuous process by passing the fiber first through low temperature carbonization to 600° C. and then subsequently through high temperature carbonization to 1200° C. All carbonization was performed under nitrogen. The properties of the carbonized fibers are also shown in FIG. 1.

Oxidized and carbonized fiber tensile strength (in ksi), strain at peak stress (%), and modulus (Mpsi) were determined by using an MTS Alliance RT/5 tester following the ASTM standard method D3379.

Example 3

Lignin Concentration Affects Solution Viscosity

Lignin has a low degree of polymerization and produces low viscosity solutions when dissolved in a compatible organic solvent and to solids levels in excess of 50% when heated. Lignin, when blended with a synthetic polymer or synthetic copolymer blend (PAN, copolymers of PAN), substantially reduces the viscosity of resulting solution or fiber dope solution, when compared at equivalent solution solids level and temperature (see Table 3).

TABLE 3

Viscosities of Various Lignin/PAN-containing Solutions

| Polymer Solution @ 14% solids | Brookfield Viscosity @ ~50° C., poise |
|---|---|
| PAN 1 Only | 67 |
| PAN 1 with 15% Lignin | 43 |
| PAN 1 with 30% Lignin | 18 |

The relationship of lignin content to the resulting solution viscosity is dependent on the total solids that are prepared, which is illustrated in FIG. 2. In FIG. 2 the plot at 50% lignin has a viscosity that is below the gel viscosity.

Example 4

Generation of an Experimentally Determined Viscosity Surface Response Model

A model can be used for a preliminary determination of the amount of lignin, PAN or PAN copolymer, and total solids needed in order to achieve a desired viscosity at a given temperature. The model is based upon actual observations of viscosity for given amounts of lignin, PAN or PAN copolymer and total solids. Several rounds of observations may be needed to obtain observations that target the viscosity A lignin and PAN or PAN copolymer dope solution consists of a mixture of three components: polymer, lignin, and solvent. The weight of oven dried polymer or copolymer (P), the weight of the oven dried lignin (L), and the weight of the solvent (S) needed to achieve a fixed solids fraction and a fixed lignin fraction, is calculated:

Solids Fraction=$(P+L)/(P+L+S)$

Lignin Fraction=$L/(P+L+S)$

In this example a viscosity of 45 poise and a dope temperature of 50° C. were used for the target dope conditions. Other target values may be chosen.

The data set for determination of the response surface utilized n (30 or more) {S,L,V} data triples. The data set was then used to fit a model to the viscosity data. Coefficients from the model were used to predict viscosity at all (S,L) pairs in the relevant region of interest to produce the response surface for S, L, and V.

Viscosity, V, is modeled as a function of Lignin, L, and Solids, S. One model is:

$$V=\beta_0+\beta_1 L+\beta_2 S+\beta_3 LS+\beta_4 L^2+\beta_5 S^2+\beta_6 L^2 S^2+\beta_7 L^2 S+\beta_8 S^2 L+\beta_9 L^3+\beta_{10} S^3+\beta_{11} L^3 S+\beta_{12} S^3 L+\beta_{13} L^3 S^2+\beta_{14} L^3 S^2$$

Equation 1

The purpose of the model is to obtain a smoothing function that: (1) fits the observed data well; (2) has enough degrees of freedom for error; and (3) allows for drawing of a smooth surface at selected {S,L} pairs.

Projection to Latent Structure (PLS) was selected as the method for model fitting, as it typically fits data very adequately.

Figure 3:
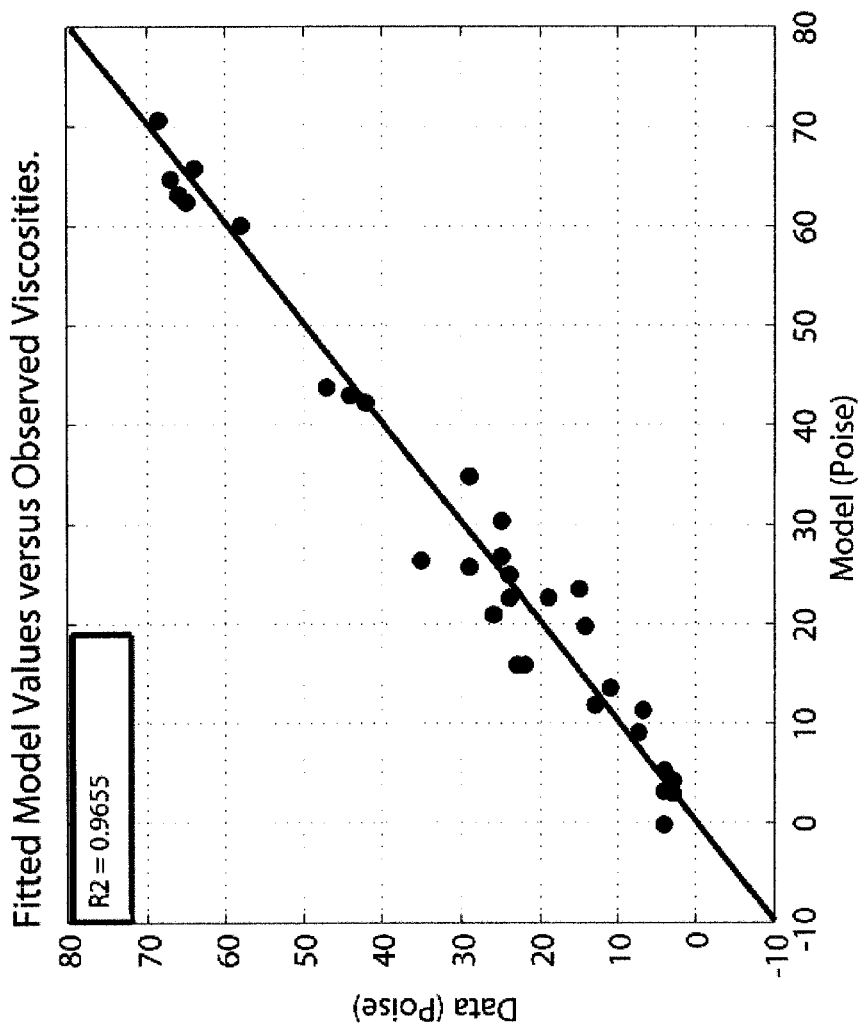
FIG. 3 is a graph showing the observed versus predicted viscosities for PAN 4 at 50° C.

FIG. 3 shows observed vs. predicted viscosities for PAN 4 at 50° C. There are 31 points and the model has 15 parameters, so there are 16 degrees of freedom for error. The $r^2$ value is 0.97, so the model and the data are in respectable agreement.

Coefficients from the fitted model were then used to estimate viscosity at all {S, L} pairs over the ranges 0.12<S<0.2 and 0.1<L<0.5. The resulting viscosity surface is shown in FIG. 4, where the viscosity values over 60 poise and under 30 poise were truncated, leaving only the values in the vicinity of the target viscosity, 45 poise.

Figure 4:
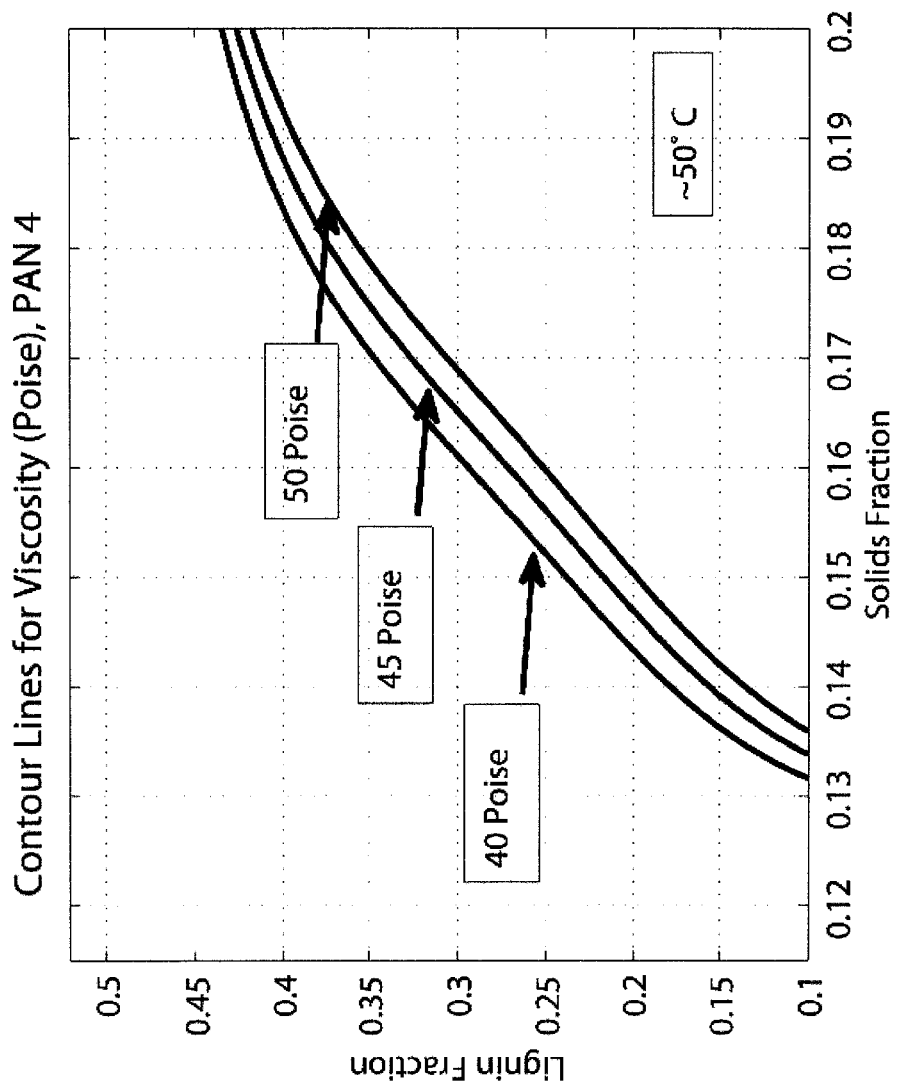
FIG. 4 shows viscosity as a function of solids and lignin for PAN 4.

FIG. 4 demonstrates that the response surface for lignin- and PAN-containing solutions can be very steep and the region of acceptable viscosity to achieve good fiber spinnability may be limited, which demonstrates the value of this modeling approach in order to enhance the probability of achieving successful dope properties for fiber production.

Example 5

Stability of Lignin/PAN Solutions

Figure 5:
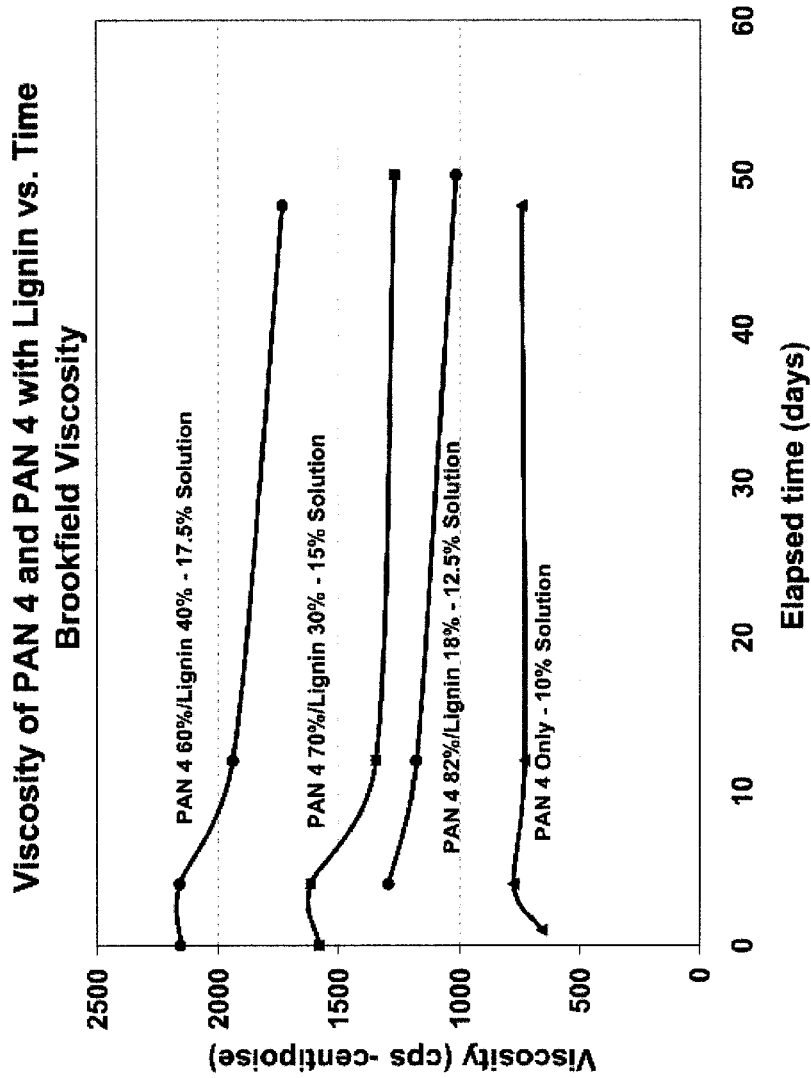
FIG. 5 shows the viscosity of PAN 4 and PAN 4 with lignin as measured over time.

FIG. 5 shows the viscosity of PAN 4 and lignin with PAN 4 as measured over time. Solutions of lignin and PAN exhibit good viscosity stability over time and there was no apparent effect on viscosity stability due to lignin content in the prepared polymer solution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A fiber dope solution comprising lignin, and polyacrylonitrile or polyacrylonitrile copolymer, in an organic solvent that dissolves both the lignin and the polyacrylonitrile or polyacrylonitrile copolymer, wherein the solution has a solids content of from 10 to 35% of the total weight of the solution, wherein the lignin is 5 to 45% of the total weight of solids in the solution and wherein solution has a viscosity of 20 to 1500 poise at a temperature of 20° C. to 80° C.

2. The fiber dope solution of claim 1 wherein the solution has a viscosity of 20 to 1000 poise at a temperature of 20° C. to 80° C.

3. The fiber dope solution of claim 1 wherein the solution has a viscosity of 20 to 500 poise at a temperature of 20° C. to 80° C.

4. The fiber dope solution of claim 1 wherein the solution has a viscosity of 20 to 100 poise at a temperature of 20° C. to 80° C.

5. The fiber dope solution of claim 1 wherein the lignin is 10 to 45% of the total weight of the solids in the solution.

6. The fiber dope solution of claim 1 wherein the lignin is 30 to 45% of the total weight of the solids in the solution.

7. A method of producing a fiber dope solution comprising combining lignin, and polyacrylonitrile or polyacrylonitrile copolymer, and an organic solvent that dissolves both the lignin and the polyacrylonitrile or polyacrylonitrile copolymer, to produce a fiber dope solution having a viscosity of about 20 to about 1500 poise at a temperature of about 20° C. to about 80° C., wherein the total solids in the solution is 10 to 35% of the total weight of the solution, and wherein the weight of the lignin in the solution is 5 to 45% of the weight of the solids in the solution.

8. The method of claim 7 further comprising forming a fiber from the dope by spinning, coagulating and extracting the solvent to form a fiber, wherein the spinning is one of solution spinning or dry jet wet spinning.

9. The method of claim 8 further comprising stretching the fiber to decrease the diameter of the fiber and further increase molecular orientation.

10. The method of claim 9 further comprising washing the fiber to remove residual solvent from the fiber.

11. The method of claim 8 further comprising heating the fiber in air atmosphere at a temperature in the range of 200 to 300° C.

12. The method of claim 11 further comprising carbonizing the fiber in an inert atmosphere at a temperature of 600 to 2000° C.

13. The product of the process of claim 11.

14. The product of the process of claim 12.

* * * * *